United States Patent [19]

Hammerstrom

[11] Patent Number: 5,214,598
[45] Date of Patent: May 25, 1993

[54] UNBIASED BIT DISPOSAL APPARATUS AND METHOD

[75] Inventor: Daniel W. Hammerstrom, Aloha, Oreg.

[73] Assignee: Adaptive Solutions, Inc., Beaverton, Oreg.

[21] Appl. No.: 713,721

[22] Filed: Jun. 11, 1991

[30] Foreign Application Priority Data

Nov. 9, 1990 [WO] PCT Int'l
Appl. .................. PCT/US90/06594

[51] Int. Cl.⁵ .................................. G06F 7/38
[52] U.S. Cl. .................................. 364/745
[58] Field of Search ..................... 364/745, 748

[56] References Cited

U.S. PATENT DOCUMENTS

| | | | |
|---|---|---|---|
| 3,891,837 | 6/1975 | Sunstein | 364/745 |
| 4,340,940 | 7/1982 | Williams, Jr. et al. | 364/745 |
| 4,442,498 | 4/1984 | Rosen | 364/745 |
| 4,589,084 | 5/1986 | Fling et al. | 364/745 |
| 4,727,506 | 2/1988 | Fling | 364/745 |
| 4,831,576 | 5/1989 | Kunimoto | 364/745 |

Primary Examiner—Long T. Nguyen
Attorney, Agent, or Firm—Kolisch, Hartwell, Dickinson, McCormack & Heuser

[57] ABSTRACT

A bit disposal apparatus includes a register (16) which is divided at a truncation point (14) into a left register segment (18) and a right register segment (28), wherein bits to be disposed of are contained in the right register segment. A decision mechanism initially examines the bits in the right register segment (28) and transmits a "1" signal (60) if and only if any of the bits in the right register segment is a "1". If any of the bits in the right register segment is a "1", a 1 is "jammed" into the least significant bit location (26a) of a result register (26a).

A method of bit disposal includes the steps of setting a truncation point (14) in a register (16), thereby defining left (16) and right (28) register segments (54), loading a binary number into the register (56), examining the bits in the right register segment (58) and transmitting a right register signal which has a "1" value (60) if any of the bits in the right register segment is a "1", and replacing the least significant bit in a result register with a "1" if the right register signal has a "1" value (64).

5 Claims, 2 Drawing Sheets

UNBIASED BIT DISPOSAL APPARATUS AND METHOD

TECHNICAL FIELD

The instant invention relates to a computer processor architecture and a method for handling data, and specifically to an architecture and method which provides unbiased, error free bit disposal during data truncation.

BACKGROUND ART

Bit disposal is the process of eliminating undesired bits in a binary number in a way that has some desirable numerical property. Truncation is the most common way of disposing of bits, which are typically located to the right of a binary point in a binary number. Pure truncation, the simple removal of bits beyond a certain point in a binary number, always results in an error, in that part of the number is lost. In addition to the error, pure truncation is biased, in that the resulting number is always smaller or equal to the original number, resulting in a negative bias. Numbers are truncated to remove unwanted bits, such as are present after multiplication or division operation.

For instance, and noe using decimal numbers as an example to facilitate the discussion, if a number such as 6.75 is truncated to an integer value, the value is 6. After several such numbers have been truncated and arithmetically combined, the resulting number may be significantly smaller than the number which would have been derived had truncation not occurred. With pure truncation, it does not matter whether the original number is 6.005 or 6.995, the truncated value is 6. The following table depicts the results of bit disposal using pure truncation, wherein it is assumed that truncation takes place at the binary point:

TABLE 1

| Original Number | Truncated Number | Error |
| --- | --- | --- |
| 111 | 11 | −.1 |
| 110 | 11 | 0 |
| 101 | 10 | −.1 |
| 100 | 10 | 0 |
| 011 | 01 | −.1 |
| 010 | 01 | 0 |
| 001 | 00 | −.1 |
| 000 | 00 | 0 |
| ↑ binary point | | |

In the context of computer manipulation, pure truncation is a very efficient technique in that it requires no additional hardware. The resulting error, however, is quite large, and the bias is that the truncated number is always equal to or smaller than the actual number. Additionally, the bias is always negative. As used herein, +ve indicates a positive bias, while −ve indicates a negative bias.

Another technique for truncating a number is called rounding. In the case of rounding, the value of the number portion being retained is examined and either retained or increased to the next incremental retained value, depending on whether or not the portion being discarded is equal to or greater than, typically, one-half the incremental value. The results of rounding are less error prone than in pure truncation, however, over a long series of operations, rounding becomes biased because the break point between selecting the next higher or retaining the lower value is always rounded in favor of either higher or lower. In the usual case of rounding up those values which are precisely one-half of the value between the increments, the bias becomes positive over time. The following table illustrates the error and bias associated with traditional rounding techniques:

TABLE 2

| Original Number | Rounded Number | Error | Bias |
| --- | --- | --- | --- |
| 3.758 | 3.76 | +.02 | +ve |
| 4.234 | 2.23 | −.04 | −ve |
| 5.355 | 5.36 | +.05 | +ve |
| 1.333 | 1.33 | −.03 | −ve |
| 7.897 | 7.90 | +.03 | +ve |
| 8.335 | 8.34 | +.05 | +ve |

Of the six numbers shown, two are rounded up less than 0.05, two are rounded down less than 0.05, and two are rounded up by exactly 0.05, resulting in four of the six roundings having a positive bias.

The bias in rounding may be eliminated by the symmetric pairing of positive and negative biases for any collection of numbers. However, hardware is required to analyze the incremental steps in a number series. Such a variation of rounding is called round to even or R*. In R* rounding, the one-half values are, as much as possible, symmetrically evenly rounded up and down. Assuming that each rounding, up or down, is equally likely, and that positive and negative errors offset one another, bias is virtually eliminated, assuming all cases are equally likely, and a small error variance results. However, the provision of the required hardware, which at a minimum is a separate adder, is expensive in terms of overall architecture design.

Another form of truncation is called jamming, or von Neumann rounding. In the case of binary numbers, whenever a bit is discarded, a "one" is "jammed" into the least significant bit (LSB) of the remaining number. This technique requires very little hardware, but induces the same total bias as does rounding, although it requires no more time than pure truncation. The error variance induced by jamming is larger than that with truncation because a "one" is always placed in the least significant bit, regardless of the value of the truncated bit. Examples of "jammed" numbers are given in Table 3:

TABLE 3

| Original Number | Truncated Number | Error |
| --- | --- | --- |
| 111 | 11 | −.1 |
| 110 | 11 | 0 |
| 101 | 11 | +.1 |
| 100 | 11 | +.1 |
| 011 | 01 | 0 |
| 010 | 01 | 0 |
| 001 | 01 | +.1 |
| 000 | 01 | +.1 |
| ↑ binary point | | |

Digital computers are equally sensitive to bias as they are to absolute error variance values. Neural network computers, however, are much more sensitive to bias than they are to absolute error values. It is desirable, therefore, to provide a bit disposal apparatus and technique which is as bias free as possible. Because neural network computers are small in terms of total circuitry, such a disposal technique must also be small, i.e., require little hardware.

DISCLOSURE OF THE INVENTION

An object of the invention is to provide a bit disposal apparatus and method which minimizes both error variance and provides a zero, or neutral, bias.

Another object of the invention is to provide a bit disposal method which requires very little additional computer architecture.

A further object of the invention is to provide a bit jamming architecture and method which is relatively bias and error free.

The bit jamming apparatus of the invention includes a register which is divided at a truncation point into a left register segment and a right register segment, wherein bits to be disposed of are contained in the right register segment. A decision mechanism initially examines the bits in the right register segment and transmits a "1" signal if and only if any of the bits in the right register segment is a "1". If any of the bits in the right register segment is a "1", a 1 is "jammed" into the least significant bit of a result register.

The method of the invention includes the steps of setting a truncation point in a register, thereby defining left and right register segments, loading a binary number into the left register, shifting the bits to be truncated to the right register segment, examining the bits in the right register segment and transmitting a right register signal which has a "1" value if any of the bits in the right register segment is a "1", and transmitting a right register which as a "∅" value iff none of the bits in the right register is a "1", and replacing the least significant bit in a result register segment with a "1" if the right register signal has a "1" value.

These and other objects and advantages of the invention will become more fully apparent as the description which follows is read in conjunction with the drawings.

BEST MODE FOR CARRYING OUT THE INVENTION

As previously noted, neural networks are error tolerant, but are sensitive to bias. Neural networks are a form of architecture which enables a computer to closely approximate biological information processing.

The processing of primary cognitive information by computers, such as computer speech recognition, computer vision and robotic control represent a number of practical problems which cannot be efficiently solved using existing, conventional algorithms executed by traditional, conventional computers. Such problems are often incompletely specified and are characterized by many weak constraints requiring large search spaces. Traditional computer models tend to bog down to the point of failure under the computational load if tasked to solve these types of problems. Such problems are, however, solved by animal brains which are much slower than transistors and which are able to problem solve given incomplete information.

One of the advantages of neural networks is their ability to utilize low precision data by examining gross values to reach a decision, which is similar to animal brains which are capable of ignoring minutia while examining gross values to reach a decision. The digital computer equivalent is a process known as data truncation, or bit disposal, wherein part of a value, such as that which is a by-product of digital computation, is discarded and the remaining part of the value is analyzed. As previously discussed, there are a number of ways of truncating values, all of which induce either a bias, an error, or both, or require an impractical amount of hardward and/or time to accomplish the disposal of unneeded information.

Figure 1:
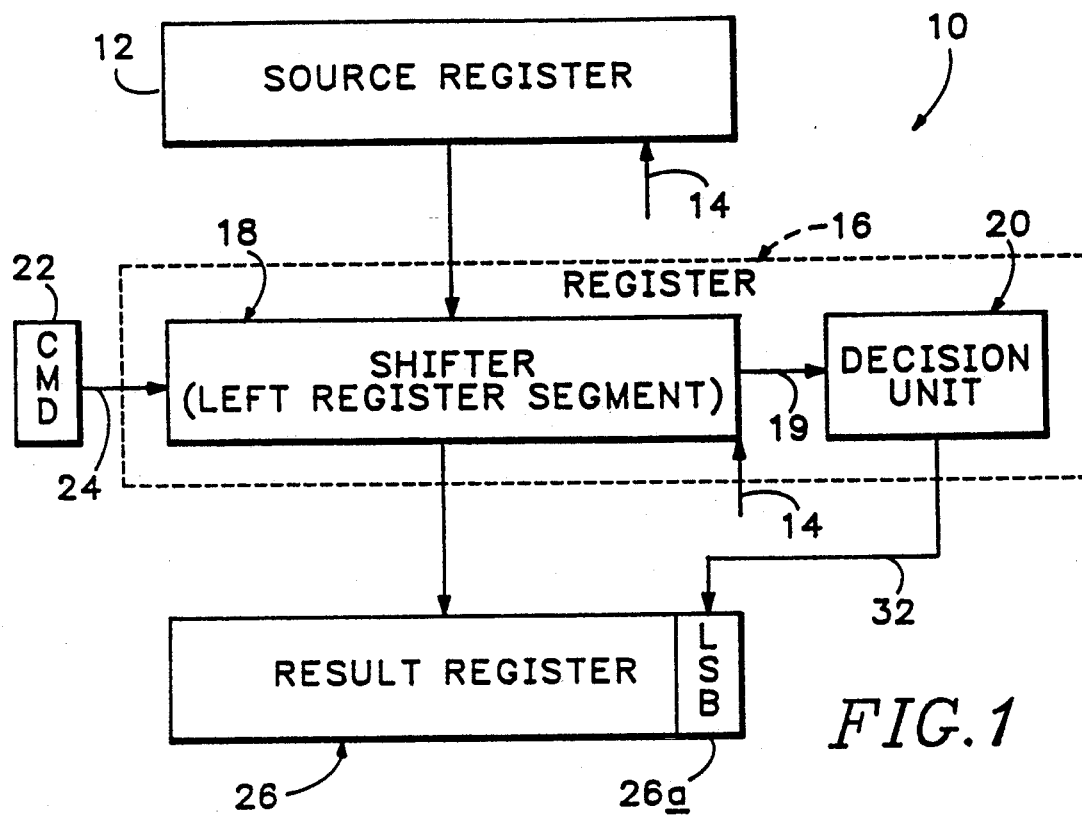
FIG. 1 is an expanded, schematic diagram of the bit disposal apparatus of the invention.

Referring now to FIG. 1, a schematic representation of the bit jamming apparatus of the invention is depicted generally at 10. Apparatus 10 includes a source register 12, which may, for example, contain sixteen bit locations, each containing one bit of data. A truncation point, indicated by arrow 14 is set between two selected bit locations. Truncation point 14 may also be a binary point in the number.

A second, or truncation, register 16 receives signals from source register 12 which are indicative of 1's and ∅'s. Truncation point 14 divides register 16 into a left register segment, or shifter, 18 and a decision unit 20. As a result of bit disposal using the bit jamming apparatus and method of the invention, bits in locations to the right of binary point 14 will be disposed of. In the preferred embodiment, source register 12 contains 16 bits of information. Shifter 18 may accommodate all of these bits, or be instructed by a command from a command module 22, which enters over command bus 24, to truncate a number of bits. This instruction causes left register segment 16 to shift the defined number of bits over connection 19 into decision unit 20. All of the bits remaining in left register segment 18 after the shift command has been executed are transferred to a result register 26, which includes a least significant bit (LSB) location 26a.

In the process of disposing of the bits in the right register segment, the least significant bit in the result register may be changed. In the case of a binary number, such as:

$$1\emptyset\emptyset11\emptyset\emptyset\emptyset1\emptyset\emptyset\emptyset\emptyset\emptyset$$
$$\uparrow$$

the presence of a 1 anywhere in the right register segment, those bits which are to be truncated, will result in a 1 being placed at the location of the least significant bit of the bit-jammed number in result register 26. If a 1 is already present in LSB location 26a, it will remain there.

Truncation point 14 is determined by the shift register count in command module 22, which is set by the programmer, or by the program itself, either of which may constitute means for setting the truncation point in register 16, thereby determining what bits are transferred to decision unit 20.

Figure 2:
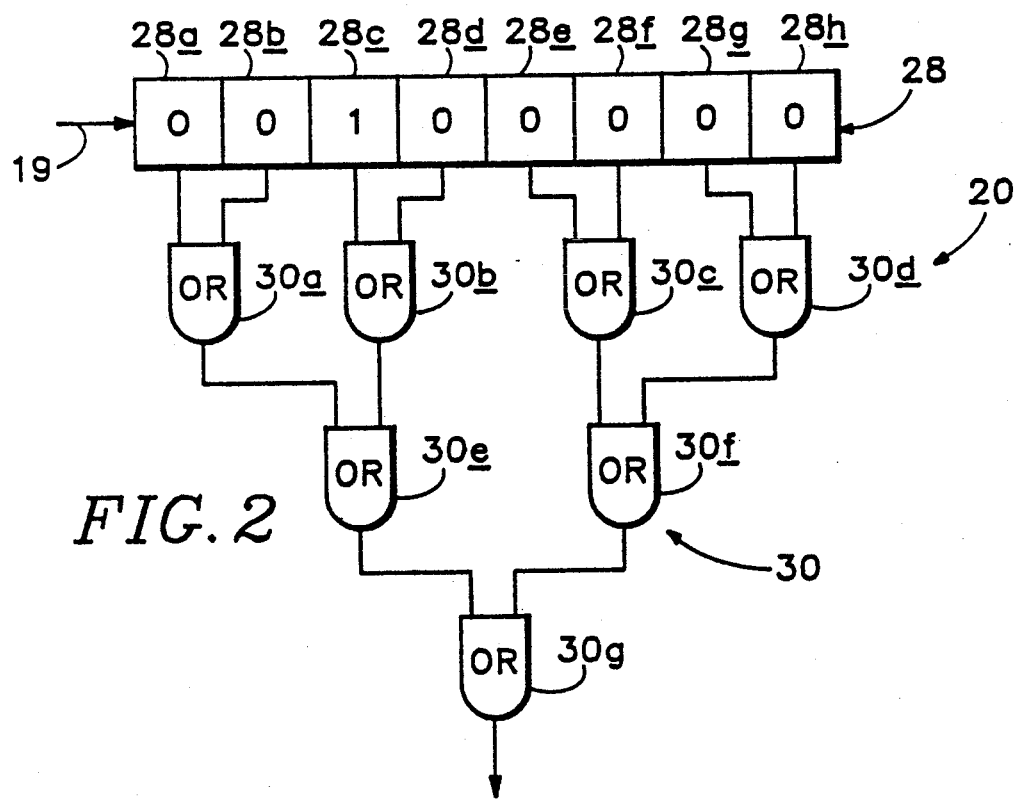
FIG. 2 is a schematic representation of an OR unit of the invention.

Decision unit 20 is connected to left register segment 18 and to LSB location 26a. Referring now to FIG. 2, decision unit 20 includes a right register segment 28, having bit locations 28a-28h, and an array 30 of OR gates, also referred to herein as decision means or an OR unit, which includes a first tier of OR gates having OR gates 30a-30d, a second tier of OR gates, including OR gates 30e, 30f, and a third tier having OR gate 30g.

If and only if (iff) any of the bits in the right register segment is a 1, decision means 30 will transmit a "1" signal on a connection 32 to LSB location 26a in result register 26. As depicted in FIG. 2, eight bits of the number have been shifted into right register segment 28. All of the bits are 0 except for the bit located at bit location 28c. This will result in a "1" being output from OR gate 30g when the value in register segment 28 is evaluated. Put another way, a 1 is "jammed" into bit location 26a of register 26, regardless of the original value of the LSB of left register 18, which in this case, is a 0. If none of the bits in any bit location in right register segment 28 are a "1", a "0" signal is transmitted on connection 32 by OR gate 30g.

Although the structure depicted in FIG. 2 contains seven OR gates, it should be appreciated that other numbers of OR gates may be required. Specifically, if n bits are to be disposed of, n−1 OR gates are required for the structure of the invention. Although the structure may have unused OR gates, an OR gate is a small, relatively inexpensive structure, and the provision of usually idle OR gates will not otherwise degrade the performance of the circuit. Assuming that a nominal 16 bit architecture incorporates the structure of the invention, it is unlikely that more than 8 bits would be disposed of, therefore, in the preferred embodiment, seven OR gates are provided in the structure of the invention. All of the OR gates depicted are of the two-input type, Alternately, the first tier might use two four-input OR gates and the second tier would include a single double-input OR gate. So long as sufficient OR structures, n−1, are provided, the requisite number of bits may be truncated and "jammed" into the LSB location of the result register. If there are more OR structures provided than are required, the additional structures will remain idle, while receiving and transmitting "0" signals.

In operation, array 30, and initially OR gate 30b, receives two inputs, which are a "1" and a "0" signal, respectively, from bit locations 28c and 28d. OR gate 30b transmits a "1" signal to OR gate 30e in the second tier, which also receives a "0" signal from OR gate 30a. Ultimately, a "1" signal is transmitted over connector 32 to bit location 26a, which accounts for a "1" being jammed into the LSB location, regardless of whether a "1" value is already present of not.

Figure 3:
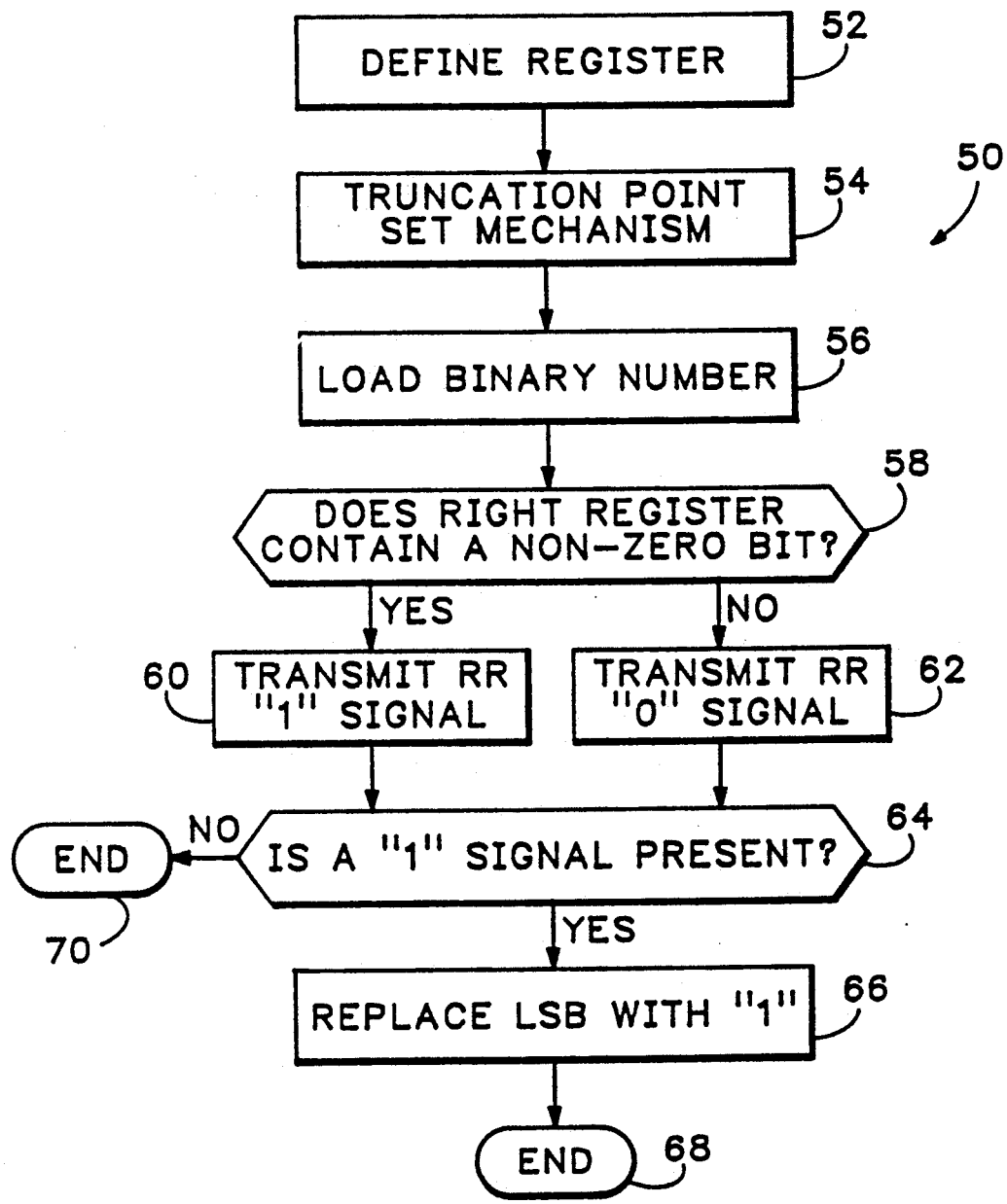
FIG. 3 is a block diagram depicting steps in the bit disposal method of the invention.

To further define the method of the invention, and now referring to FIG. 3, the sequence of events in the bit jamming method are depicted generally at 50. The first step requires that a register be defined, block 52. The register may be defined to any convenient, or allowable number of bits in length, depending on the configuration of the hardware of the architecture.

Next, the truncation point set mechanism is activated, block 54 which provides means for setting the truncation point 14, to define the left and right register segments, and to set the number of bits which will be disposed of. The binary number is then loaded into the register, block 56.

The OR gate array 30 next examines the bits in the right register and determines whether any bit has a non-zero value. The transmitted values concatenated to the last OR gate, as described above, and as represented by block 58. If any of the bits have a non-zero value, a right register segment "1" signal is transmitted to the LSB location of result register 26, block 60. If none of the bits in right register segment 28 have a non-zero value, a "0" signal is transmitted the LSB location of result register 26, block 62. If a "1" signal reaches the LSB location, block 64, a 1 is "jammed" into the LSB location, block 66, and the sequence ends, block 68. If a "1" signal is not transmitted to the LSB location, the value originally in the LSB location remains and the sequence ends, block 70.

The results of a short sequence of numbers which have been truncated using the bit jamming structure and method of the invention are set forth as follows:

TABLE 4

| Original Number | Truncated Number | Error | Bias |
| --- | --- | --- | --- |
| 111 | 11 | −.1 | −ve |
| 110 | 11 | 0 | none |
| 101 | 11 | +.1 | +ve |
| 100 | 10 | 0 | none |
| 011 | 01 | −.1 | −ve |
| 010 | 01 | 0 | none |
| 001 | 01 | +.1 | +ve |
| 000 | 00 | 0 | none |

↑
binary point

As is depicted in Table 4, the error variance values are minimized, or "even out" over the course of truncating a series of numbers. Likewise, the bias works out to have a mean "zero" value as there should be, for any given set of numbers, equal positive and negative bias. The apparatus and the method therefore provide unbiased truncation of data. Although the examples used herein are all positive number, it should be appreciated that the apparatus and method work equally well for negative numbers.

Thus, a method and an apparatus for practicing a minimal error variance, bias free bit disposal routine has been disclosed. The structure and method are particularly useful for use in neural nets, although may be used with any computer architecture. The structure and method results in bit disposal which is not biased and which, given a reasonable sample of truncated numbers, has minimized error variance.

Although a preferred embodiment of the structure and method of the invention have been disclosed herein, it should be appreciated that variations and modifications may be made thereto without departing from the scope of the invention as defined in the appended claims.

INDUSTRIAL APPLICABILITY

The apparatus and method of the invention are particularly suited for truncating numbers in data handling systems such as neural network computers, because it requires minimal additional hardware, programming, and because it has zero bias. The apparatus and method will work equally well if used in conventional computers.

What I claimed is:

1. An unbiased bit jamming structure for use in a computer architecture for truncating, bias free, a binary number, comprising:

a source register (12) containing a binary number to be operated upon;

a second register (16) for retaining a predetermined number of bits to be retained;

means for setting (54) a truncation point (14) in said second register (16), thereby defining a left register segment (18), containing a number of bits of said binary number to be retained, and a right register segment (28), containing the remaining number of bits of said binary number to be truncated;

a result register (26) for receiving the bits to be retained from said second register (16), wherein said result register (26) includes a least significant bit (LSB) position (26a);

decision means (30), connected to said right register segment (28) for reading the bits in said right register segment (28) and for generating a "1" signal (60) iff any of the bits in said right register segment (28) is a "1", and for loading a "1" into said LSB position (26a) regardless of the value originally contained in said LSB position.

2. The bit jamming structure of claim 1 wherein said decision means (30) includes n−1 OR gates, where n is the number of bits to be truncated.

3. An unbiased bit jamming structure for use in a computer architecture for truncating, bias free, a binary number, comprising:

a register (16) for containing a binary number consisting of a predetermined number of binary bits therein, and having a truncation point (14) therein, said register having a left register segment (18) located to the left of said truncation point (14), containing a number of bits of said binary number to be retained, and a right register segment (28) located to the right of said truncation point (14), containing the remaining number of bits of said binary number to be truncated;

a result register (26) having a least significant bit (LSB) location (26a) for receiving the data from said left register segment (18); and an OR gate array (30) connected to said right register segment (28) for reading the bits in said right register segment (28) and for transmitting a "1" signal (60) iff any of the bits in said right register segment is a "1", for loading a "1" into said LSB location (26a) regardless of the value originally contained in said LSB position.

4. The bit jamming structure of claim 3 where said decision means (30) includes n−1 OR gates, where n is the number of bits to be truncated.

5. A method of truncating, bias free, a number in a computer architecture comprising:

setting (54) a truncation point (14) in a register (16);

defining left (16) and right (28) register segment with the truncation point (14);

loading a binary number (56) into the register (16);

shifting the binary number in the register (16) such that the portion of the number to be retained remains in the left register segment (16) and the portion to be truncated is placed in the right register segment (28);

moving the retained bits to a result register (26);

examining (58) the bits in the right register segment (28);

transmitting a right register signal which has a "1" value (60) iff any of the bits in the right register segment (28) is a "1", replacing (66) the least significant bit in the result register (26) with a "1" iff the right register signal (60) has a "1" value.

* * * * *